(12) United States Patent
Yamasaki

(10) Patent No.: US 10,099,305 B2
(45) Date of Patent: Oct. 16, 2018

(54) ELECTRIC DISCHARGE MACHINE HAVING ROTARY TABLE

(71) Applicant: FANUC Corporation, Yamanashi (JP)

(72) Inventor: Mizuho Yamasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 94 days.

(21) Appl. No.: 14/464,799

(22) Filed: Aug. 21, 2014

(65) Prior Publication Data
US 2015/0053651 A1 Feb. 26, 2015

(30) Foreign Application Priority Data

Aug. 26, 2013 (JP) .................................. 2013-174535

(51) Int. Cl.
*B23H 11/00* (2006.01)
*B23H 7/20* (2006.01)

(52) U.S. Cl.
CPC ............. *B23H 11/003* (2013.01); *B23H 7/20* (2013.01)

(58) Field of Classification Search
CPC ........... B23H 11/003; B23H 7/20; B23H 3/00
USPC .............. 219/69.11, 69.14, 69.2; 204/224 M
See application file for complete search history.

(56) References Cited

U.S. PATENT DOCUMENTS

| | | | | |
|---|---|---|---|---|
| 3,975,608 A | * | 8/1976 | Ullmann | B23H 7/28 219/69.16 |
| 4,337,385 A | * | 6/1982 | Maropis | B23Q 1/621 219/69.2 |
| 6,437,277 B1 | | 8/2002 | Moro et al. | |
| 2002/0148814 A1 | * | 10/2002 | Ishiwata | B23H 1/00 219/69.2 |
| 2004/0075218 A1 | | 4/2004 | Heinzen | |
| 2006/0235354 A1 | | 10/2006 | Kaal et al. | |
| 2013/0193000 A1 | | 8/2013 | Platz | |
| 2013/0218316 A1 | * | 8/2013 | Zhang | B24B 37/013 700/108 |

FOREIGN PATENT DOCUMENTS

| | | |
|---|---|---|
| CN | 102069250 A | 5/2011 |
| CN | 201841418 U  * | 5/2011 |
| CN | 102581408 A | 7/2012 |
| CN | 202317342 U | 7/2012 |
| CN | 202398909 U  * | 8/2012 |
| DE | 102012201305 A1 | 8/2013 |
| EP | 1760343 A1 | 3/2007 |
| JP | 8-290322 A | 11/1996 |
| JP | H08-290332 A | 11/1996 |
| JP | 2004-314228   * | 11/2004 |
| JP | 2004-314228 A | 11/2004 |

(Continued)

OTHER PUBLICATIONS

Extended European Search Report dated Feb. 27, 2015, corresponding to European patent application No. 14181719.7.

(Continued)

*Primary Examiner* — Thien S Tran
(74) *Attorney, Agent, or Firm* — Hauptman Ham, LLP

(57) ABSTRACT

An electric discharge machine is provided with a rotary table disposed in a working tank and fitted with an object to be machined. The rotary table is provided with a working fluid penetration detection unit configured to detect penetration of a working fluid into the rotary table body.

8 Claims, 6 Drawing Sheets

(56) References Cited

FOREIGN PATENT DOCUMENTS

| JP | 2004314228 A | * | 11/2004 |
| JP | 2005-118915 A | | 5/2005 |
| JP | 2008-272853 A | | 11/2008 |
| JP | 2009-113156 A | | 5/2009 |
| JP | 2011-104725 A | | 6/2011 |
| WO | 00/23221 A1 | | 4/2000 |

OTHER PUBLICATIONS

EPO communication regarding Third Party Observation dated May 18, 2015, corresponding to European patent application No. 14181719.7.
Office Action dated Dec. 22, 2014, corresponding to Japanese patent application No. 2013-174535.
Korean Office Action dated Oct. 2, 2015, corresponding to Korean Patent Application No. 10-2014-0108797.
Office Action dated Sep. 6, 2015, corresponding to Chinese Patent Application No. 201410422133.8.

\* cited by examiner

ELECTRIC DISCHARGE MACHINE HAVING ROTARY TABLE

RELATED APPLICATIONS

The present application claims priority to Japanese Application Number 2013-174535, filed Aug. 26, 2013, the disclosure of which is hereby incorporated by reference herein in its entirety.

BACKGROUND OF THE INVENTION

Field of the Invention

The present invention relates to an electric discharge machine having a rotary table.

Description of the Related Art

FIG. 6 is a view illustrating a conventional rotary table structure used in an electric discharge machine or the like.

As shown in FIG. 6, a power unit 2 and a speed reduction unit 3 are disposed in a rotary table body 1. A bearing support section 7 is attached to the distal end side of the rotary table body 1, and a bearing section 4 is supported by the bearing support section 7. A shaft 5 and a faceplate 6 are secured to the opposite sides of the bearing section 4, and they can freely rotate in synchronism with the rotation of the speed reduction unit 3. A sealing mechanism section 8 is provided in the vicinity of the bearing support section 7, and sealing members 9 are arranged in the sealing mechanism section 8. The sealing members 9 are configured to contact the outer peripheral surface of the faceplate 6, thereby preventing a working fluid from intruding the rotary table body 1 through a gap 13 between the sealing mechanism section 8 and the faceplate 6.

During machining by means of the electric discharge machine, chips or sludge is produced and suspended in the working fluid. If the sludge adheres to the sealing mechanism section 8, it causes early wear of the sealing members 9, so that a rotary table with an air-seal structure has been proposed to overcome this problem (Japanese Patent Application Laid-Open No. 2011-104725).

While the sealing members 9, which are consumables, require periodic replacement, their life greatly depends on the operating conditions, working hours, and the frequency of daily cleaning. Thus, the replacement time for the sealing members 9 is not specifically determined, and an operator is expected to periodically replace the sealing members 9, based on visual inspection or preventive maintenance.

If the operator fails to inspect the sealing members 9, therefore, the working fluid may intrude the rotary table body 1, thereby damaging important components, including the power unit 2 and the speed reduction unit 3, in the rotary table.

SUMMARY OF THE INVENTION

Accordingly, in view of the prior art problems described above, the object of the present invention is to provide an electric discharge machine with a rotary table which includes means for detecting penetration of a working fluid into a body of the rotary table.

An electric discharge machine according to the present invention includes a rotary table, disposed in a working tank and fitted with an object to be machined, and a controller configured to control the rotary table to perform electric discharge machining. The rotary table includes a rotary table body, a table rotating body pivotally supported on the rotary table body and configured to rotate, a drive unit for rotating the table rotating body, a sealing mechanism section including a sealing member disposed between the rotary table body and the table rotating body, and a working fluid penetration detection unit configured to detect penetration of a working fluid into the rotary table body.

The controller may be configured to perform control to stop the rotary table when the penetration of the working fluid into the rotary table body is detected by the working fluid penetration detection unit.

The controller can perform control to discharge the working fluid from the working tank and control to stop water supply to the working tank when the penetration of the working fluid into the rotary table body is detected by the working fluid penetration detection unit.

The controller may comprise a display unit on which an abnormality or a warning is displayed when the penetration of the working fluid into the rotary table body is detected by the working fluid penetration detection unit.

The rotary table body may include a rotary table body section, a bearing support section, and the sealing mechanism section, and a transparent window may be provided on the side of the rotary table body section, the bearing support section, and/or the sealing mechanism section.

The rotary table body may include a rotary table body section, a bearing support section, and the sealing mechanism section, and a drain hole may be provided on the side of the rotary table body section, the bearing support section, and/or the sealing mechanism section.

According to the present invention, there can be provided an electric discharge machine having a rotary table which includes means for detecting penetration of a working fluid into a body of the rotary table.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
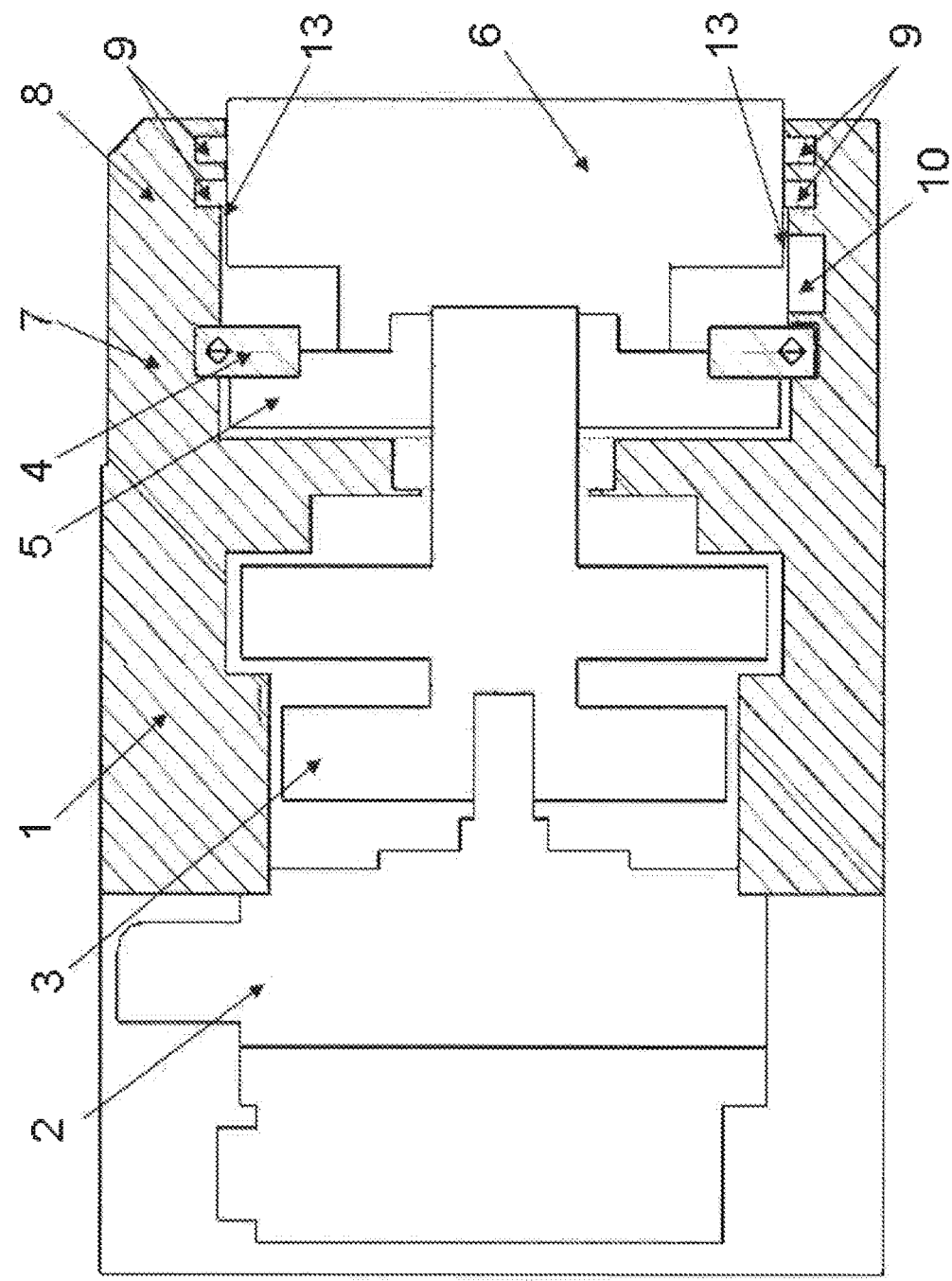
FIG. 1 is a sectional view of a rotary table structure with a working fluid penetration detection unit for detecting penetration of a working fluid.
Figure 2:
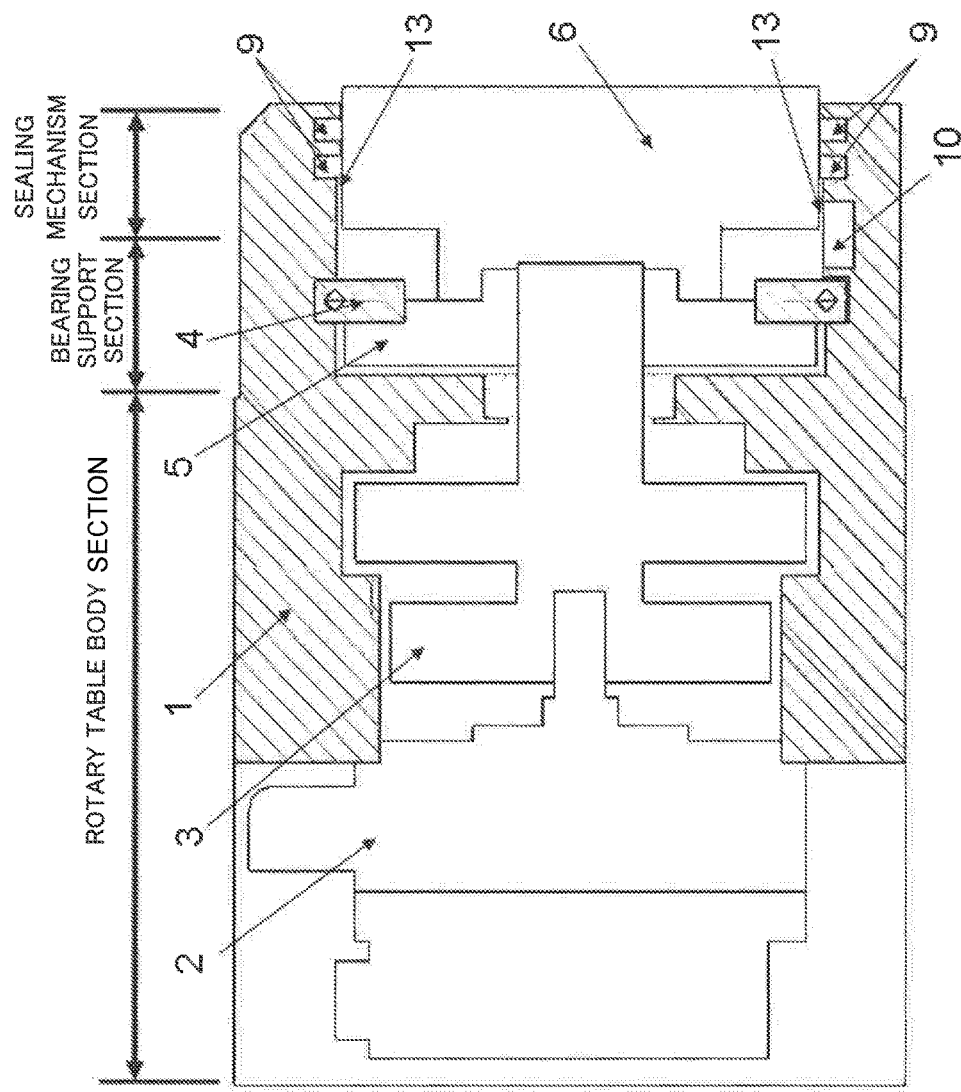
FIG. 2 is a view illustrating of a rotary table body which includes a rotary table body section, bearing support section, and sealing mechanism section.
Figure 3:
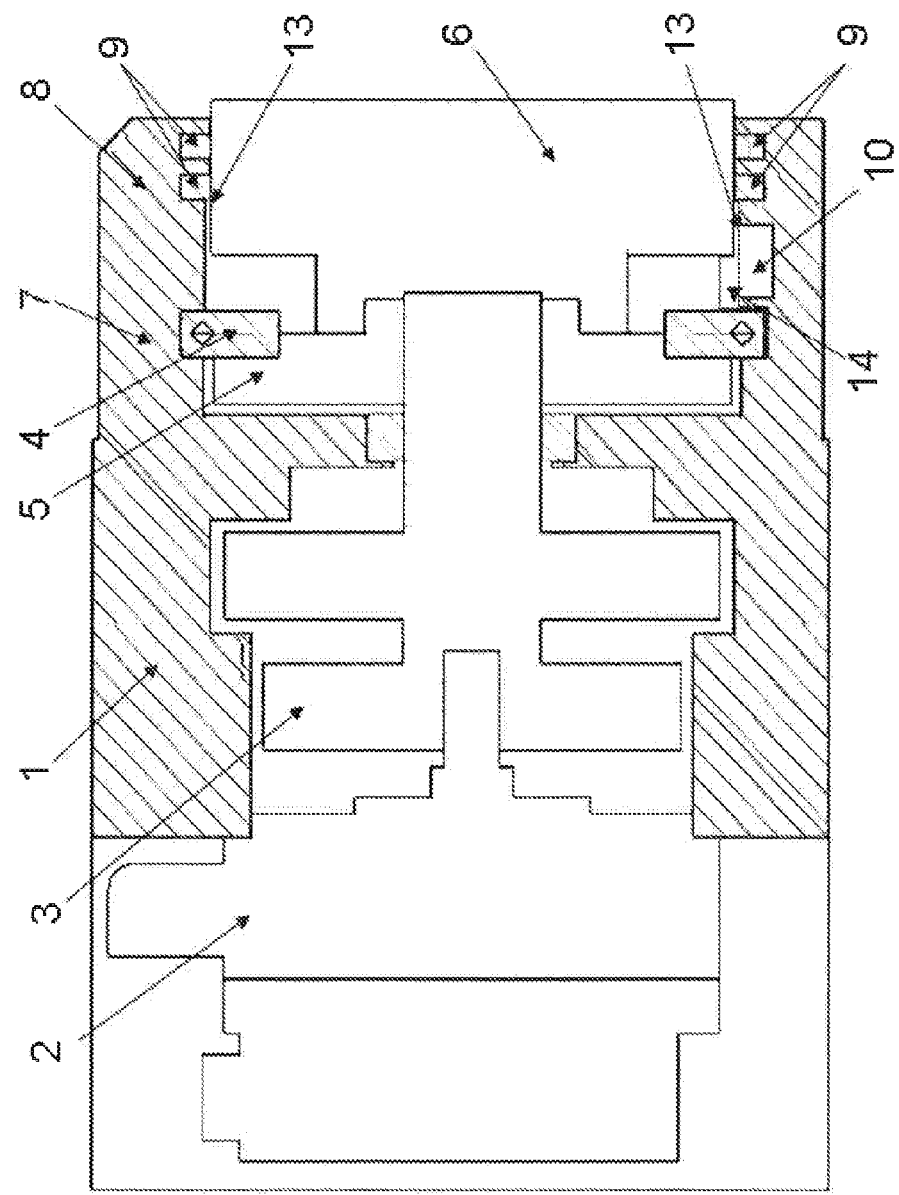
FIG. 3 is a sectional view of the rotary table showing how the working fluid introduced into the rotary table builds up on the working fluid penetration detection unit.

FIG. 1 is a sectional view of a rotary table structure with a working fluid penetration detection unit for detecting penetration of a working fluid. FIG. 2 is a view illustrating of a rotary table body which includes a rotary table body section, bearing support section, and sealing mechanism section. Further, FIG. 3 shows how the working fluid introduced into the rotary table builds up on the working fluid penetration detection unit.

As shown in FIG. 2, a rotary table body 1 comprises the rotary table body section, bearing support section, and sealing mechanism section. The rotary table body 1 is a hollow structure in which a power unit 2 and a speed reduction unit 3 are disposed. A bearing support section 7 is attached to the rotary table body 1 on the side of the distal end, and a bearing section 4 is supported by the bearing support section 7. A shaft 5 and a faceplate (table rotating body) 6 are secured to the bearing section 4 on the opposite sides thereof, and they can freely rotate in synchronism with the rotation of the speed reduction unit 3.

A sealing mechanism section 8 is provided in the vicinity of the bearing support section 7, and sealing members 9 are set in the sealing mechanism section 8. The sealing members 9 are configured to contact the outer peripheral surface of the faceplate 6, thereby preventing the working fluid from intruding the rotary table body 1 through a gap 13 between the sealing mechanism section 8 and the faceplate 6.

The bearing support section 7 and the sealing mechanism section 8 of the rotary table body 1 may be formed separately from each other. Specifically, the rotary table body 1 may be formed by assembling the three cylindrical components, that is, the rotary table body section, bearing support section, and sealing mechanism section, to one another by coupling means such as a screw structure.

In an embodiment of the present invention, as shown in FIG. 1, moreover, a working fluid penetration detection unit 10 for detecting penetration of the working fluid is provided in the vicinity of the sealing mechanism section 8 in the rotary table body 1. The working fluid penetration detection unit 10 is attached to the rotary table body 1 in such a manner that it is located below the rotary table when the rotary table is mounted in an electric discharge machine.

The working fluid penetration detection unit 10 is provided with two electrodes that are insulated from each other. Further, the working fluid penetration detection unit 10 is attached to the rotary table body 1 in an insulated manner. If the working fluid, which is an electrically conductive liquid, penetrates between the two insulated electrodes of the working fluid penetration detection unit 10, the electrodes are electrically connected and made conductive to each other.

Since the working fluid penetration detection unit 10 is attached to the rotary table body 1 in an insulated manner, as described above, electrical conduction between these two components cannot be confirmed even if a voltage is applied to them. If a working fluid 14 introduced into the rotary table body 1 through the gap 13 builds up on the working fluid penetration detection unit 10, as shown in FIG. 3, however, the rotary table body 1 and the other electrode are made conductive to each other by the working fluid 14. In this example, the electrical conduction can be confirmed based on the change of a potential difference between the working fluid penetration detection unit 10 and the rotary table body 1, so that the penetration of the working fluid can be detected.

The working fluid penetration detection unit 10 can use various other conventional techniques, such as a capacitance sensor, optical sensor, etc., in place of the two insulated electrodes. In this case, the capacitance of the capacitance sensor changes as the working fluid penetrates between the two electrodes, so that the penetration of the working fluid into the rotary table body 1 can be detected based on the capacitance change. On the other hand, the refractive index of the optical sensor in an optical path between the light-projecting side and light-receiving side changes when the working fluid penetrates between the two sides. Thus, the amount of light incident on the light-receiving side varies, so that the penetration of the working fluid into the rotary table body 1 can be detected based on the change of the amount of the incident light.

Figure 4:
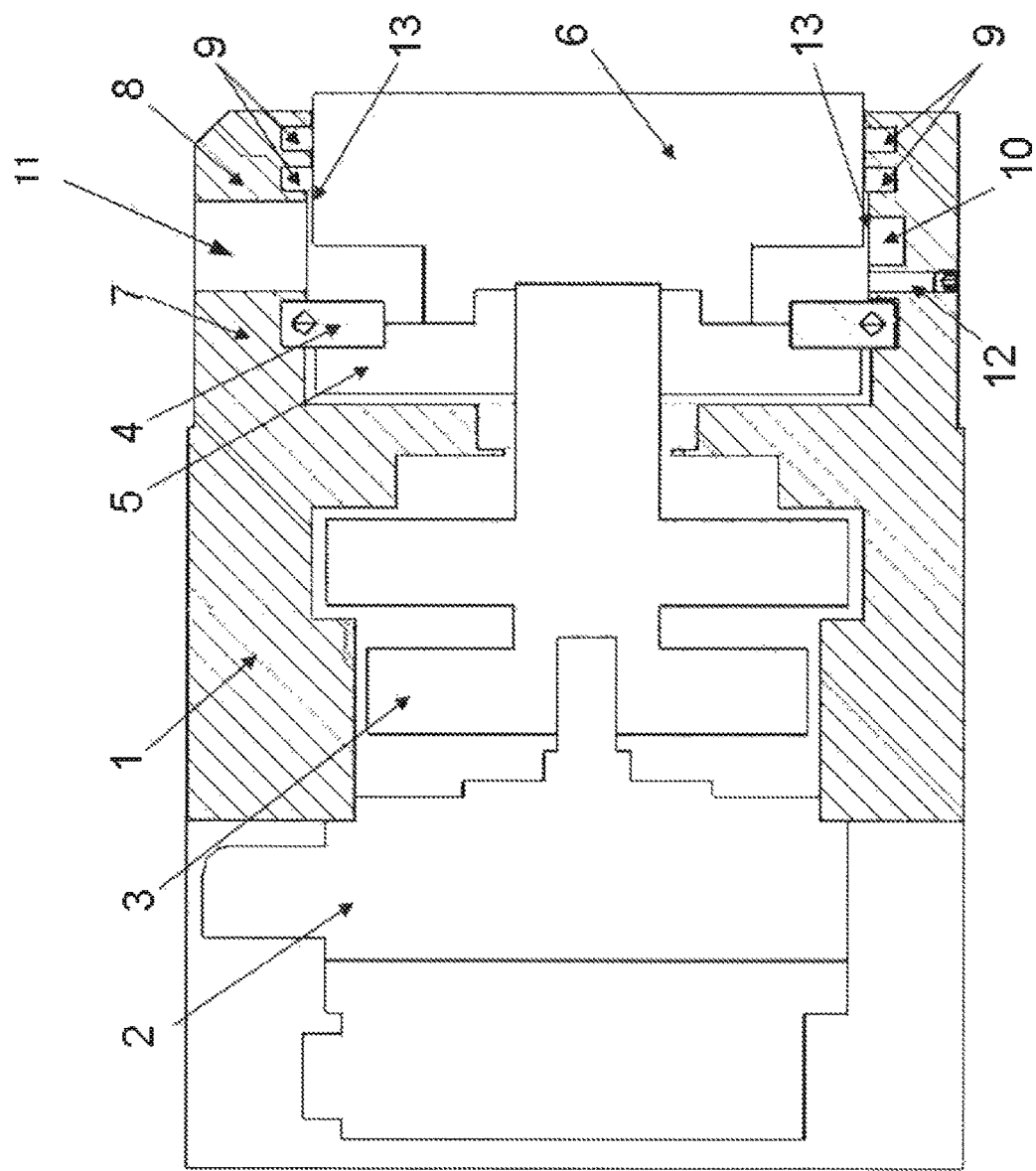
FIG. 4 is a sectional view of a rotary table structure with a transparent window for internal observation and a drain hole.

The rotary table body 1 described above may be provided with a transparent window for internal observation and a drain hole through which the working fluid introduced into the rotary table body 1 is discharged to the outside. FIG. 4 shows a rotary table structure with the transparent window for internal observation and the drain hole.

As shown in FIG. 4, a transparent window 11 for internal observation and a drain hole 12 are provided on the side of the rotary table body 1. An operator of the electric discharge machine can suitably visually recognize the interior of the rotary table body 1 through the transparent window 11, depending on the state of detection by the working fluid penetration detection unit 10. If necessary, the working fluid in the rotary table body 1 can be discharged through the drain hole 12 without disassembling the sealing mechanism section 8 of the rotary table body 1. Thus, the down time of the electric discharge machine can be minimized. Since the rotary table in the electric discharge machine is submerged in water when it is operated, the drain hole 12 is fitted with a plug such as a screw.

In the case where the rotary table body 1 includes the three cylindrical components, that is, the rotary table body section, bearing support section, and sealing mechanism section, as described above, the transparent window 11 and the drain hole 12 are suitably located in regions through which the interior is to be recognized or the working fluid is to be discharged. The working fluid adhering to the surfaces of the components in the rotary table body 1 can be visually observed through such transparent windows suitably located in various regions.

Figure 5:
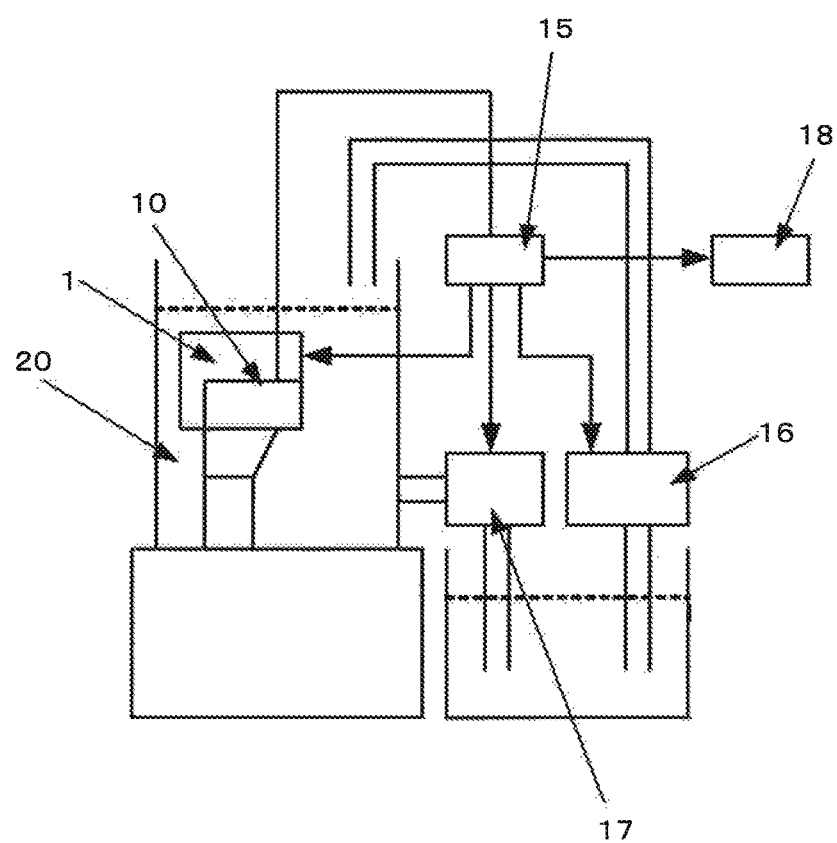
FIG. 5 is a function block diagram illustrating a principal part of the electric discharge machine having the rotary table.
Figure 6:
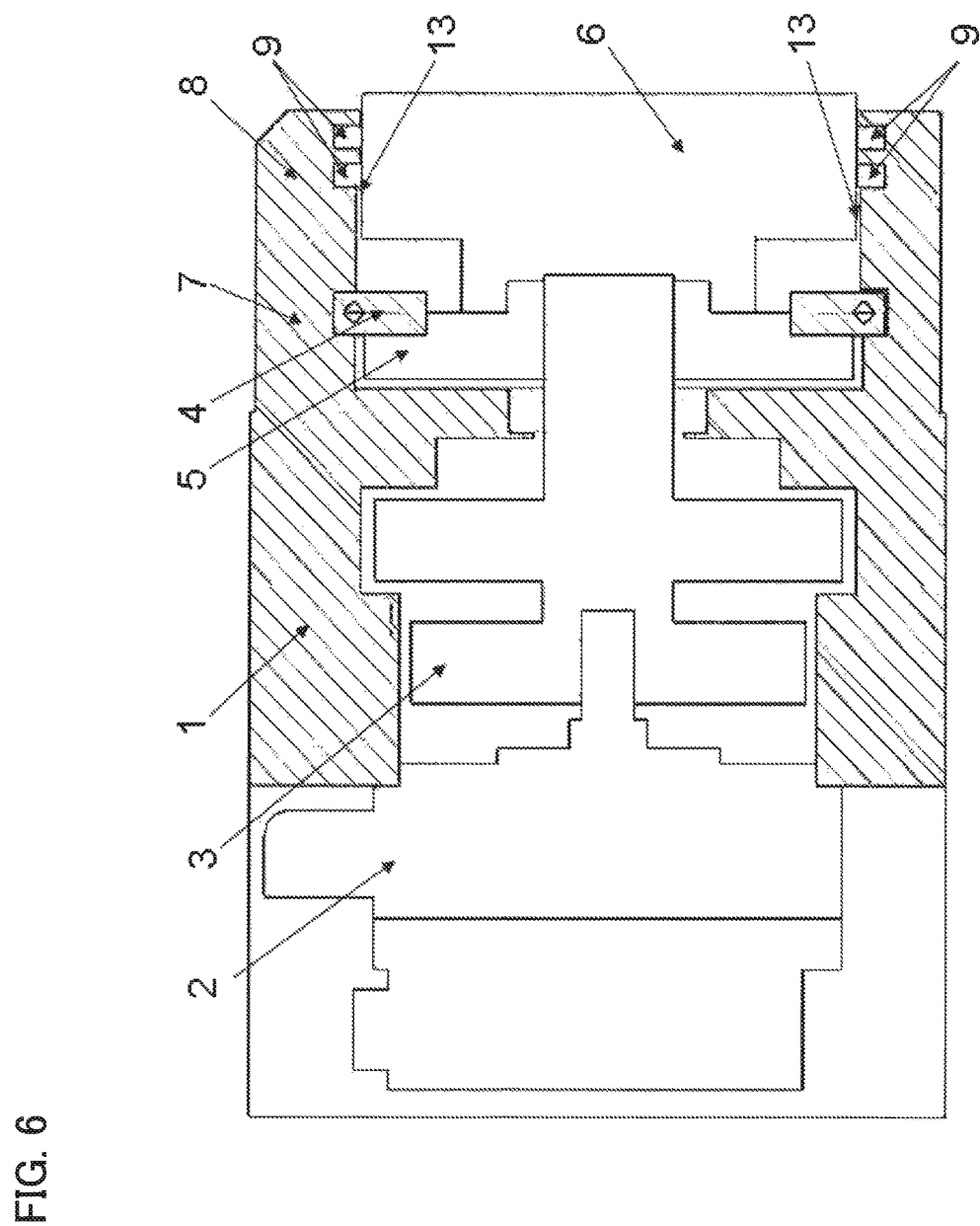
FIG. 6 is a view illustrating a conventional rotary table structure.

FIG. 5 is a function block diagram illustrating a principal part of the electric discharge machine with the rotary table.

A controller 15 can control the action of the rotary table body 1, a working fluid supply unit 16 for feeding the working fluid into a working tank, and a working fluid discharge unit 17 for discharging the working fluid from the working tank.

If the working fluid penetration detection unit 10 in the rotary table body 1 detects penetration of the working fluid when a working tank 20 of FIG. 5 is filled with the working fluid, application of a discharge voltage from a power source is suspended to stop the rotation of the rotary table body 1, the working fluid supply unit 16 is quickly stopped, and the working fluid discharge unit 17 is activated. By executing these steps of control in response to commands from the controller 15, the penetration of the working fluid into the rotary table body 1 can be prevented in an early stage. Even if the working tank 20 is not filled with the working fluid, moreover, control can be performed to prohibit the rotation of the rotary table body 1 and the operation of the working fluid supply unit 16 when the penetration of the working fluid is detected by the working fluid penetration detection unit 10 in the rotary table body 1.

The controller 15 comprises a display unit 18 such that the operator can accurately grasp the state of the rotary table body 1 by displaying an abnormality or a warning on the display unit 18, depending on the state of the working fluid penetration detection unit 10 in the rotary table body 1.

The invention claimed is:

1. An electric discharge machine, comprising:
   a working tank configured to contain a working fluid;
   a rotary table disposed in the working tank, the rotary table configured to be fitted with an object to be machined; and
   a processor configured to control the rotary table to perform electric discharge machining,
   the rotary table comprising:
      a rotary table body;
      a faceplate pivotally supported on the rotary table body and configured to rotate;
      a drive unit configured to rotate the faceplate;
      a sealing member disposed between the rotary table body and the faceplate, and configured to seal an inside of the rotary table body from the working fluid; and
      a working fluid penetration detection unit configured to detect penetration of the working fluid into the rotary table body,
   wherein
   the rotary table body has a sealing mechanism section in which the sealing member is arranged, and
   the working fluid penetration detection unit is attached to the rotary table body at a location on the inside of the rotary table body, and faces a gap formed by the sealing mechanism section and the faceplate to detect the working fluid leaking through the sealing member into said gap.

2. The electric discharge machine according to claim 1, wherein the processor is configured to perform control to stop the rotary table when the penetration of the working fluid into the rotary table body is detected by the working fluid penetration detection unit.

3. The electric discharge machine according to claim 1, wherein the processor is configured to perform control to discharge the working fluid from the working tank and control to stop supply of the working fluid to the working tank when the penetration of the working fluid into the rotary table body is detected by the working fluid penetration detection unit.

4. The electric discharge machine according to claim 1, further comprising a display unit,
   wherein the processor is configured to cause the display unit to display an abnormality or a warning when the penetration of the working fluid into the rotary table body is detected by the working fluid penetration detection unit.

5. The electric discharge machine according to claim 1, wherein the rotary table body further includes
   a rotary table body section,
   a bearing support section, and
   a transparent window on a side of the rotary table body section, the bearing support section, and/or the sealing mechanism section.

6. The electric discharge machine according to claim 1, wherein the rotary table body further includes
   a rotary table body section,
   a bearing support section, and
   a drain hole on a side of the rotary table body section, the bearing support section, and/or the sealing mechanism section.

7. The electric discharge machine according to claim 1, wherein the working fluid penetration detection unit is attached to the rotary table body in an electrically insulated manner, and is configured to detect an electrical potential difference between the working fluid penetration detection unit and the rotary table body to whereby detect the penetration of the working fluid into the rotary table body.

8. The electric discharge machine according to claim 1, wherein
   the rotary table body further includes a bearing support section, and
   the working fluid penetration detection unit is arranged between the bearing support section and the sealing mechanism section.

* * * * *